Oct. 10, 1933.  V. P. MATHEWS  1,930,317
SHOCK ABSORBER
Filed Dec. 14, 1931    3 Sheets-Sheet 1
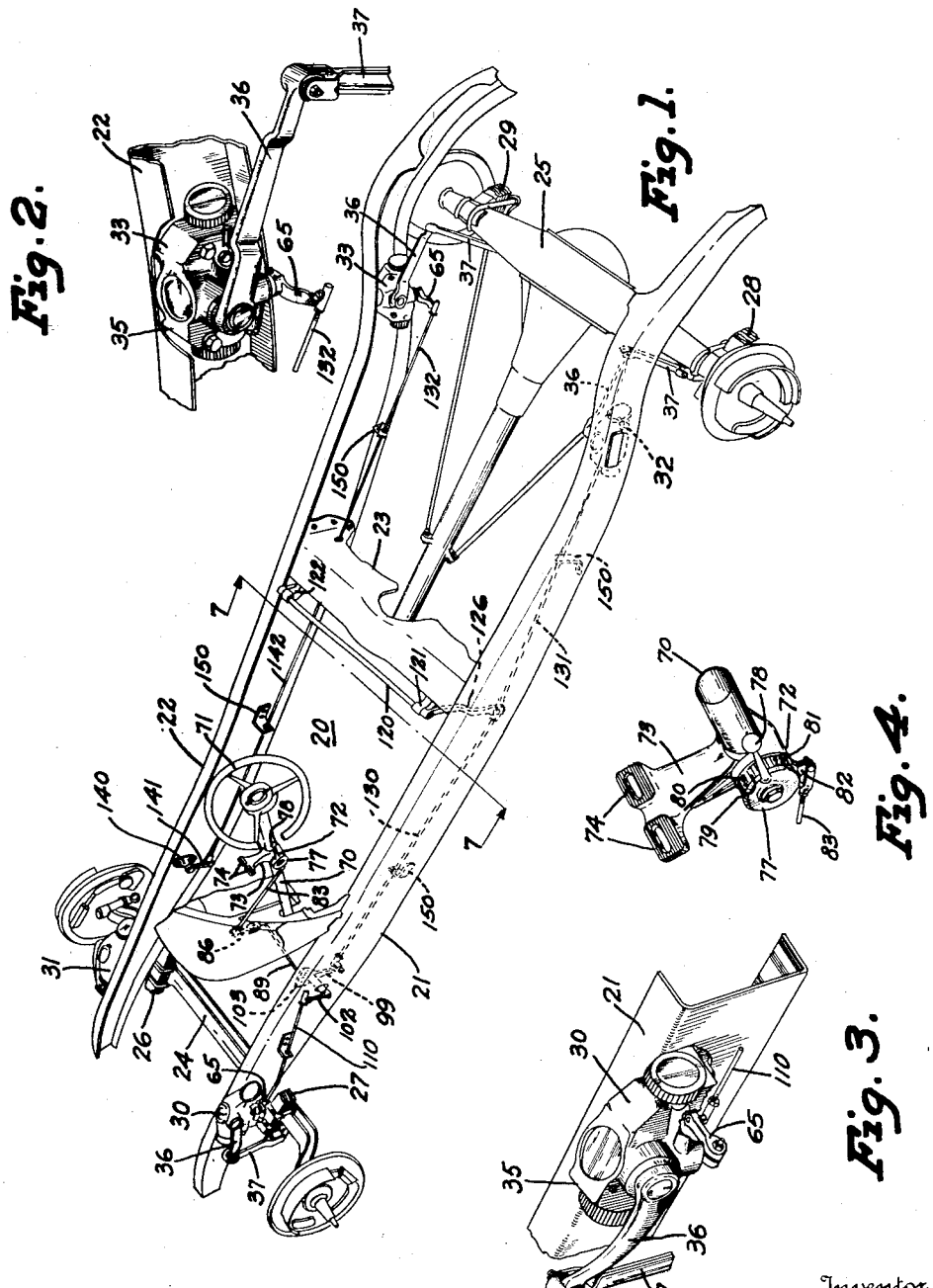
Inventor
VERNER P. MATHEWS
Attorneys Oct. 10, 1933.    V. P. MATHEWS    1,930,317
SHOCK ABSORBER
Filed Dec. 14, 1931    3 Sheets-Sheet 2
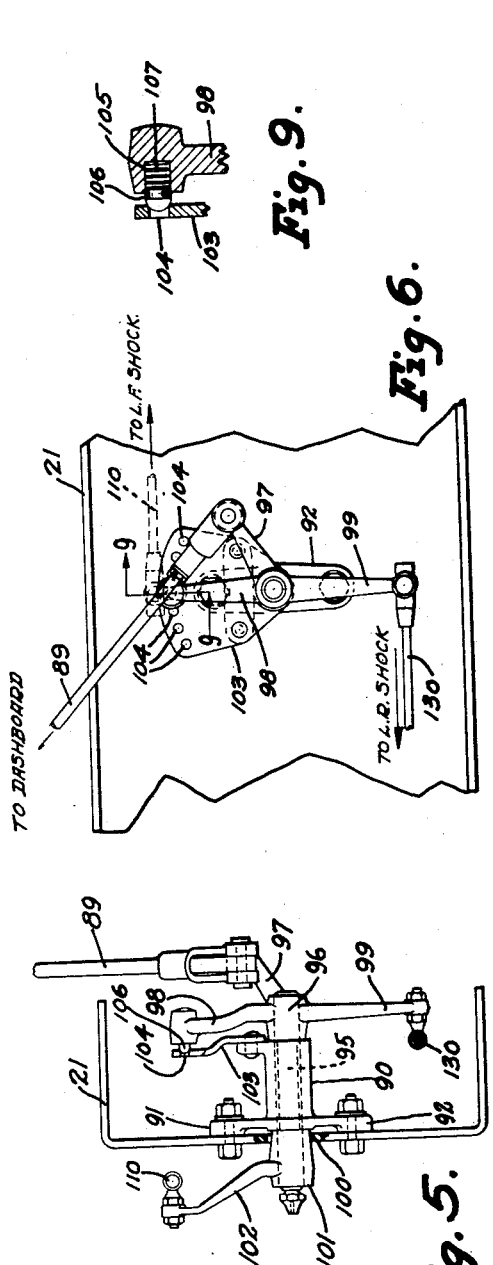
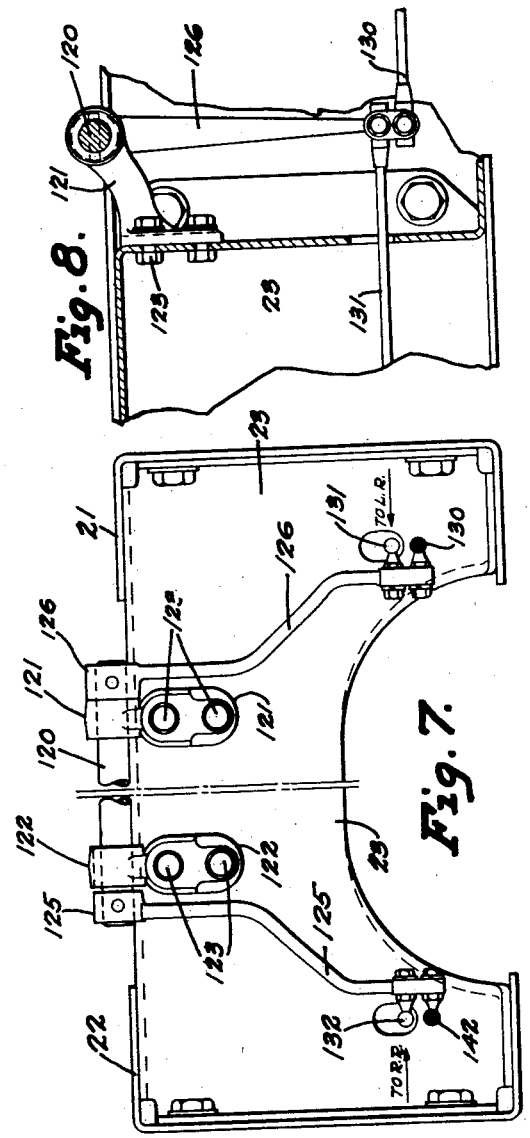
Inventor
VERNER P. MATHEWS

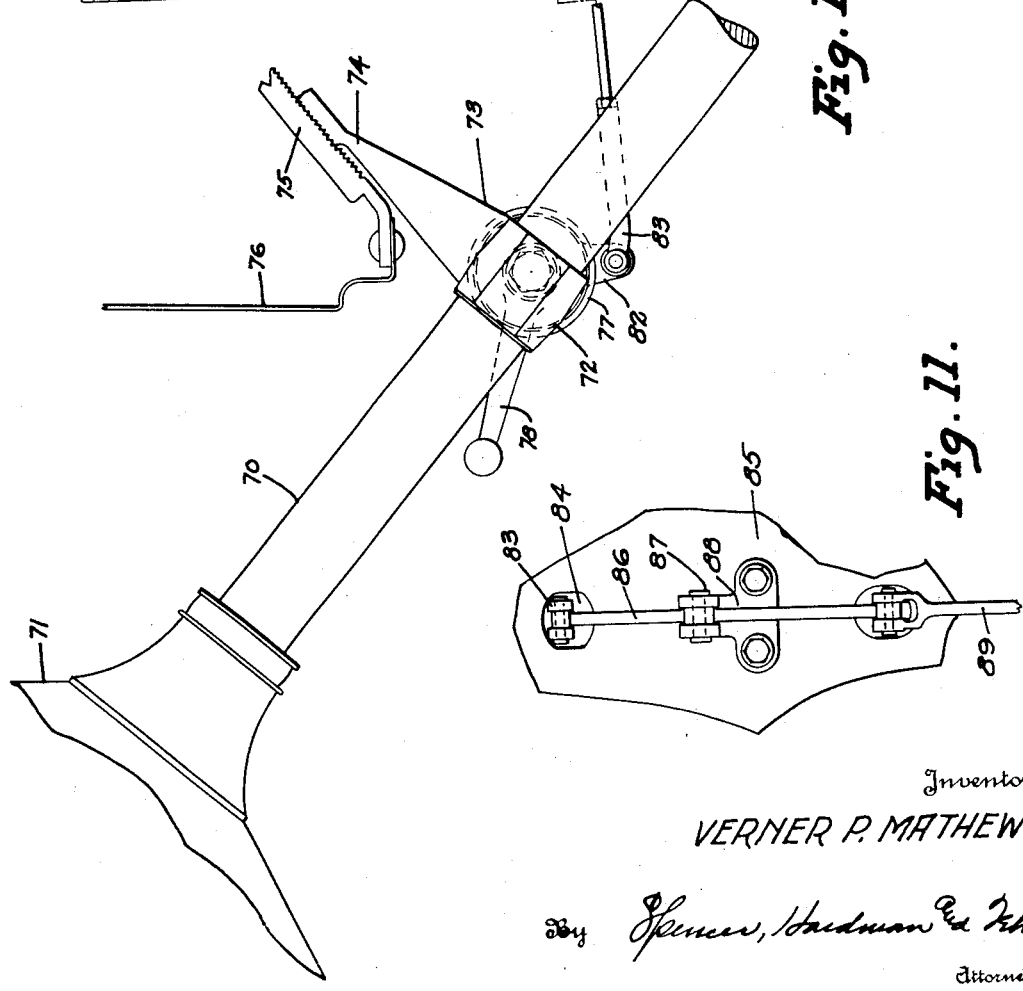

Patented Oct. 10, 1933

1,930,317

UNITED STATES PATENT OFFICE 1,930,317

SHOCK ABSORBER

Verner P. Mathews, Flint, Mich., assignor to Delco Products Corporation, Dayton, Ohio, a corporation of Delaware Application December 14, 1931
Serial No. 580,893

3 Claims. (Cl. 188—87)

This invention relates to improvements in control devices for hydraulic shock absorbers on a vehicle chassis.

It is among the objects of the present invention to provide a control device for the hydraulic shock absorbers on the chassis of a vehicle whereby said shock absorbers may be adjusted by the driver, in accordance with the nature of the road over which the vehicle is being operated.

A further object of the present invention is to provide a control device for the hydraulic shock absorbers on a vehicle chassis which is constructed and arranged to be accessible for operation from the drivers seat in the vehicle.

Further objects and advantages of the present invention will be apparent from the following description, reference being had to the accompanying drawings wherein a preferred embodiment of one form of the present invention is clearly shown.

In the drawings:

Fig. 1 is a perspective view of a vehicle chassis, certain parts being eliminated for the sake of clearness.

Fig. 2 is a perspective view of a shock absorber secured to the vehicle frame and operatively connected with the rear axle of a vehicle.

Fig. 3 is a perspective view showing a shock absorber attached to a portion of the vehicle frame and connectible with the front axle.

Fig. 4 is a perspective view of the actuator.

Fig. 5 is a view showing the motion transmitting means secured to one side member of the vehicle frame.

Fig. 6 is another view of the device shown in Fig. 5.

Fig. 7 is a fragmentary transverse sectional view taken of the vehicle frame substantially along the line 7—7 of Fig. 1. This view is on an enlarged scale as compared to Fig. 1.

Fig. 8 is a side view showing the mounting of one of the shafts of the device.

Fig. 9 is a fragmentary sectional view showing a ratchet mechanism associated with the motion transmitting means shown in Fig. 5.

Fig. 10 is a fragmentary view showing the actuator attached to the steering mechanism and the dash-board of the vehicle.

Fig. 11 is a view of a lever attached to a partition in the vehicle chassis.

Fig. 12 is a diagrammatic view showing the shock absorber mechanism.

Referring to the drawings and particularly to Fig. 1, the frame of the vehicle designated as a whole by the numeral 20, comprises side members 21 and 22 secured together in spaced relation by suitable cross members, only one of them designated by the numeral 23, being shown. Frame 20 is supported on the front axle 24 and the rear axle 25 of the vehicle by springs 26, 27, 28 and 29, only fragments of these springs being shown for the sake of clearness.

Relative movements between the frame and axles of the vehicle are controlled or resisted by hydraulic shock absorbers. The two front shock absorbers are designated by the numerals 30 and 31 and the two rear shock absorbers by the numerals 32 and 33. Each shock absorber comprises a casing 35 which is secured to the vehicle frame in any suitable manner and a shock absorber operating arm 36 which is operatively connected with its respective axle by a link 37.

In order to understand the construction of the shock absorber more clearly, reference to Fig. 12 will now be had. As has been mentioned before, each shock absorber comprises a casing 35 which provides a cylinder 40 in which a piston 41 is reciprocably supported. This piston is reciprocated in the cylinder by a rocker lever 42 provided on the rock shaft 43 which which is rotatably supported by the casing 35. One end of the rocker shaft 43 extends outside of the casing and has the shock absorber operating arm 36 attached thereto. The piston 41 provides the spring compression control chamber 44 at one end of the cylinder and a spring rebound control chamber 45 at the opposite end of the cylinder. The casing has two ducts 46 and 47 leading respectively from the spring compression control chamber 44 and the spring rebound control chamber 45 to chambers 48 and 49 provided in the casing. In chamber 48 there is provided a valve 50, yieldably urged against a seat by a spring 51 normally to shut off communication between the duct 46 and the chamber 48. A similar valve 52 in the chamber 49 is normally urged against its seat by a spring 53 whereby communication between duct 47 and the chamber 49 is normally cut off. A cross passage 54 connects duct 46 with the chamber 49 on the relief side of valve 52 and a similar cross passage 55 provides communication between duct 47 and the chamber 48 on the relief side of valve 50. From this it may be seen that, at a predetermined pressure in the chamber 44, fluid being forced through duct 46 against valve 50, will move said valve from its seat to establish a restricted flow into the chamber 48, through passage 55 and duct 47, into the opposite chamber 45. Reverse movement of the piston 41, that is, movement of this piston toward the right as regards Fig. 12, which movement is in response to movement of the vehicle spring away from the frame, results in fluid being forced from said chamber 45, through the duct 47 against valve 52, which valve is moved from its seat at a predetermined fluid pressure to establish a flow into the chamber 49 through cross passage 54 and duct 46 into the chamber 44.

These valves 50 and 52 become effective to establish restricted fluid flows between the compression chambers 44 and 45 in response to predetermined pressures only, which pressures will be established only in response to predetermined movement between the vehicle frame and axles, and thus it may be said that valves 50 and 52 are operative only when the vehicle is being driven over a comparatively rough road or at comparatively high speeds.

Each shock absorber has an adjustable fluid flow controlling means whereby the resistance offered by the shock absorber to relative movements between the frame and axles of the vehicle may be reduced substantially to provide a softer ride while the vehicle is being operated over a comparatively smooth highway or boulevard. This comprises a passage 60 providing communication between ducts 46 and 47 between cross passages 54 and 55 as shown in Fig. 12. In this passage 60 there is provided a seat 61. A screw threaded portion 62 receives the screw threaded part of the adjustable metering valve pin 63, the inner end of which is tapered as at 64 so that, as the metering valve pin 63 is rotated in one direction or the other, it thus will move the tapered end 64 toward or away from seat 61 and thereby vary the restriction to the flow of fluid between ducts 46 and 47 via the passage 60. It may readily be seen that when the valve pin 63 is turned in one direction so that its tapered end 64 moves away from seat 61, the flow of fluid between ducts 46 and 47 via the cross passage 60 will be less restricted than it would be if the pin 63 were rotated in the opposite direction so that its tapered end 64 will move into closer proximity to the valve seat 61 and thus in the first instance the shock absorber will offer less resistance to relative movements between the frame and axles of the vehicle than it would in the second instance. Each valve pin 63 has an arm or lever 65 attached thereto by which said pin may be rotated.

In the Figs. 1, 4 and 10 the numeral 70 designates the steering column which supports the steering wheel 71. Inasmuch as the steering mechanism may be of any standard type, no connection between the column 70 and the steering knuckles of the front axle is shown. On the steering column the actuator 72 for the shock absorber control device is shown. It comprises a bracket 73 attached to the steering column in any suitable manner. This bracket has feet 74 which are secured to another bracket 75 anchored to the bottom of the instrument board 76 of the vehicle. The instrument board is clearly shown in Fig. 10, but omitted from Fig. 1 for sake of clearness. Bracket 73 rotatably carries a drum 77, having the actuator handle 78 provided thereon. The drum 77 on its peripheral surface has spaced indicating marks 79 for indicating the position of adjustment of said actuator drum 77. In one position on the drum, as at 80, the words "Soft ride" may be provided which indicates that the shock absorbers are adjusted to provide for comparatively little restriction to the flow of fluid between the compression chambers therein so that said shock absorbers will offer comparatively small resistance to the relative movement between the vehicle frame and axles, while in another position designated by the numeral 81, the words "Firm ride" may appear, which indicates that the shock absorber has been adjusted increasedly to resist the relative movements between the frame and axles of the vehicle. An ear 82 extends from the peripheral surface of the drum and provides an anchorage for the forked end of a rod 83, said rod extending through an opening 84 in the partition 85 separating the engine compartment of the vehicle from the passenger compartment, this end of the rod 83 being secured to one end of a beam or lever 86 pivoted intermediate its ends as at 87. The pivot member for beam or lever 86 comprises a bracket 88 attached to the partition 85. The other end of said beam or lever 86 has the forked end of a rod 89 attached thereto.

The device is provided with a means supported by the frame to provide a central, motion transmitting station. This means comprises a tubular bearing member 90 having feet 91 and 92 which are secured to the side member 21 of the vehicle frame by bolts. This bearing member 90 rotatably supports a stub shaft 95 extending from both ends of said bearing member. The inner end of this stub shaft 95 has a hub 96 attached thereto, said hub 96 having lever arms 97, 98 and 99 extending therefrom. The other end of this stub shaft 95, extending from the inside of the bearing 90, extends also through an opening 100 in the side member 21 and has the hub 101 attached thereto which is provided with an extending lever arm 102. This bearing member 90 has a plate 103 provided at its inner end, or more specifically adjacent the lever arm 98, said plate being provided with a plurality of recesses 104 in spaced relation and arranged in a circular row substantially concentric of the axis of the stub shaft 95. Lever 98 as shown more particularly in Figs. 5 and 9 has a recess 105 in the surface adjacent the plate 103, said recess slidably supporting a plunger 106 having a rounded outer end. This plunger is urged outwardly from the lever arm 98 by a spring 107 so that the rounded end of the plunger 106 may engage with and enter the recess 104 of the plate 103. From this it may be seen that the lever arm 98 is yieldably maintained in any one of a plurality of positions or stations in its rotation by the stub shaft 95.

The lever arm 97 has the forked end of the rod 89 attached thereto so that the actuator arm or lever 78 is operatively connected with the hub 96 of the lever assembly 97, 98 and 99 through the following connections: actuator drum lug 82, rod 83, beam or lever 86 and rod 89 which, as has been mentioned, is attached to lever 97. The lever arm 102 outside the frame 21 has one end of the rod 110 attached thereto, the other end of said rod being secured to the valve actuating arm 65 of the front shock absorber 30 which, as has been mentioned, is also mounted on the outside of the side member 21 of the vehicle frame.

In referring now to the Figs. 1, 7 and 8, a cross shaft 120 is shown rotatably supported transversely of the vehicle frame 20 by brackets 121 and 122. These brackets are secured to the cross frame member 23 by bolts 123 which extend through openings provided in the feet of the bracket as shown in Figs. 7 and 8. The ends of the cross shaft 120 extend beyond the outside edges of the brackets 121 and 122 respectively as shown in Fig. 7, these ends having levers 125 and 150

126, respectively, secured thereto so that the levers will rotate with the shaft 120. As shown in Fig. 1, the free end of lever 126 is connected with the lever 99 of the motion transmitting means supported by side frame member 21, through a rod 130. This lever 126 is also connected through rod 131 with the valve actuating arm 65 of the rear shock absorber 32 secured to the side frame member 21 and operatively connected with the rear axle 25. The lever 125 is connected by rod 132 with the fluid flow controlling device actuator arm 65 of the rear shock absorber 33 which is attached to the side frame member 22 and operatively connected with the rear axle 25 as shown in Fig. 1.

The side frame member 22 at a point substantially opposite the motion transmitting means including lever arms 97, 98 and 99 in frame member 21 has a similar motion transmitting means which is adapted to transfer the longitudinal movement of the shaft inside the frame to a shaft outside the frame through a rotatable shaft extending through the frame. This device has a bearing member 140 like the bearing member 90 of frame member 21, said bearing member 140 supporting a stub shaft which extends through an opening in the frame 22 similar to the opening 100 of frame 21. At the inside end of the stub shaft of bearing 140 the lever arm 141 is attached, while at the outside of said stub shaft a lever similar to the lever arm 102 is attached. This lever arm outside the frame member 22 is not shown, but reference to Figs. 1 and 5 will clearly illustrate its construction and arrangement. The lever arm 141 has one end of rod 142 connected thereto, the other end of said rod being connected to the free end of the lever 125 of the cross shaft 120. The fluid flow controlling device of shock absorber 31, which is the front shock absorber secured to the outside of frame 22, has its operating arm similar to the arm 65 of the other shock absorbers operatively connected with the outside lever of the stub shaft supported by bearing 140, said outside lever being similar to the lever arm 102. In fact the connections between the stub shaft of bearing 140 and the shock absorber 31 is clearly illustrated by the connection between the stub shaft of bearing members 90 and the shock absorber 30.

All of the rods providing connections between the various levers extend through rubber grommets provided in the brackets 150 so that rattling of these rods is substantially eliminated.

The device functions as follows:

Supposing the driver is operating his vehicle over a comparatively smooth highway or boulevard and thus does not require the shock absorbers to offer resistance to the relative movements between the frame and axles of the vehicle, but decides to rely upon the vehicle springs to cushion the shocks, he then moves the actuator arm or lever 78 toward the "Soft ride" indication on the actuator drum 77 and thus transmits motion through the linkage connecting the actuator with the lever 97 to lever arms 98, 99 and 102. Lever arm 102 operating through rod 110 will adjust the one front shock absorber 30. Lever arm 99 will adjust the remaining shock absorbers through the folloing connections: rear shock absorber 32, through rod 130, arm 126 and rod 131. The opposite rear shock absorber 33 is adjusted through rod 130, arm 126, cross rod 120, lever arm 125 and rod 132. The other front shock absorber 31 is adjusted through rod 130, lever arm 126, cross shaft 120, lever arm 125, rod 142, lever arm 141, stub shaft in bearing 140, thence through lever rods and arms corresponding to the lever arm 102 and rod 110 of the shock absorber 30 on the opposite side of the frame. This movement of the actuator arm or lever 78 will so move the arms 65 of all of the shock absorber valves so that said valves 63 of the respective shock absorbers will be screwed outwardly, thus moving their respective tapered ends 64 from their respective seats 61 to reduce the restriction to the flow of fluid through the passages 60 and thus comparatively reduce the resistance of the shock absorbers to the relative movements between the frame and axles of the vehicle to a substantial minimum.

Encountering a comparatively rougher highway or desiring to operate at a comparatively higher speed, it is necessary to again adjust the shock absorbers so they will offer a greater resistance to frame and axle movements so that now the operator moves the actuator arm 78 toward the indication "Firm ride" on the actuator drum 77, thereby reversing the movement aforedescribed and screwing the valves 63 of the various shock absorbers toward the valve seats 61 to increase the restriction through the bypasses. It will of course be understood that intermediate adjustments may be had by moving the actuator arm or lever 78 to the various points of indication between the extreme "Soft ride" and "Firm ride" indications on the actuator drum 77.

In rotating the actuator arm or lever 78 and consequently the hub 96 including lever arm 98, the spring pressed plunger 106 will be moved from one recess 104 to another. A slight resistance to the movement of the actuator arm 78 is provided when the plunger 106 is being moved out of a recess, and on the other hand the operator may clearly feel on the actuator arm 78, when said plunger enters the next adjacent recess 104 so that the plunger 106 entering recesses 104 clearly indicates the stations of adjustment to the feel of the operator.

In the present invention applicant has provided a rigid controlling device by which the shock absorbers of the vehicle may be adjusted by the vehicle operator while he is driving the vehicle, the levers and rods being so constructed and arranged that substantially no lost motion obtains and rattling of the parts is practically eliminated.

While the form of embodiment of the present invention as herein disclosed, constitutes a preferred form, it is to be understood that other forms might be adopted, all coming within the scope of the claims which follow.

What is claimed is as follows:

1. A device for adjusting the fluid flow controlling elements of hydraulic shock absorbers operatively connected between the side members of a vehicle frame and the axles of the vehicle; comprising, a supporting member attached to one of the side members of the vehicle frame; a plate on said supporting member provided with a plurality of recesses spaced in a circular row; a lever pivotally supported by said supporting member; a plunger carried by said lever arm and yieldably urged toward said plate to enter its recesses; an actuator carried by the vehicle within reach of the drivers seat of said vehicle; means connecting the actuator with the said lever; and means operatively connecting said lever with the adjustable fluid flow controlling elements of all of the hydraulic shock absorbers for moving said elements in one direction or the other.

2. In combination with a plurality of shock absorbers on a vehicle, each shock absorber having means adjustable to determine the degree of resistance offered by the shock absorber, an actuator accessible from the driver's seat in the vehicle; rigid connections between the actuator and the adjustable means of the several shock absorbers for positively moving said means in either direction; and means associated with said operative connections for yieldably maintaining the actuator and operative connections in any one of a plurality of adjusted positions.

3. In combination with a plurality of shock absorbers on a vehicle, each shock absorber having means adjustable to determine the degree of resistance offered by the shock absorber, an actuator accessible from the driver's seat in the vehicle, said actuator having a plurality of graduations marked thereon for indicating numerous stations of adjustment; rods and levers connecting the actuator with the adjustable means of the various shock absorbers positively to move said means in opposite directions; and means on one of the levers for yieldably maintaining the actuator, rods and levers in any one of the stations of adjustment.

VERNER P. MATHEWS.